Dec. 13, 1938.          R. F. PEO ET AL          2,139,912
HYDRAULIC SHOCK ABSORBER VALVE STRUCTURE
Filed Jan. 28, 1938          4 Sheets-Sheet 1
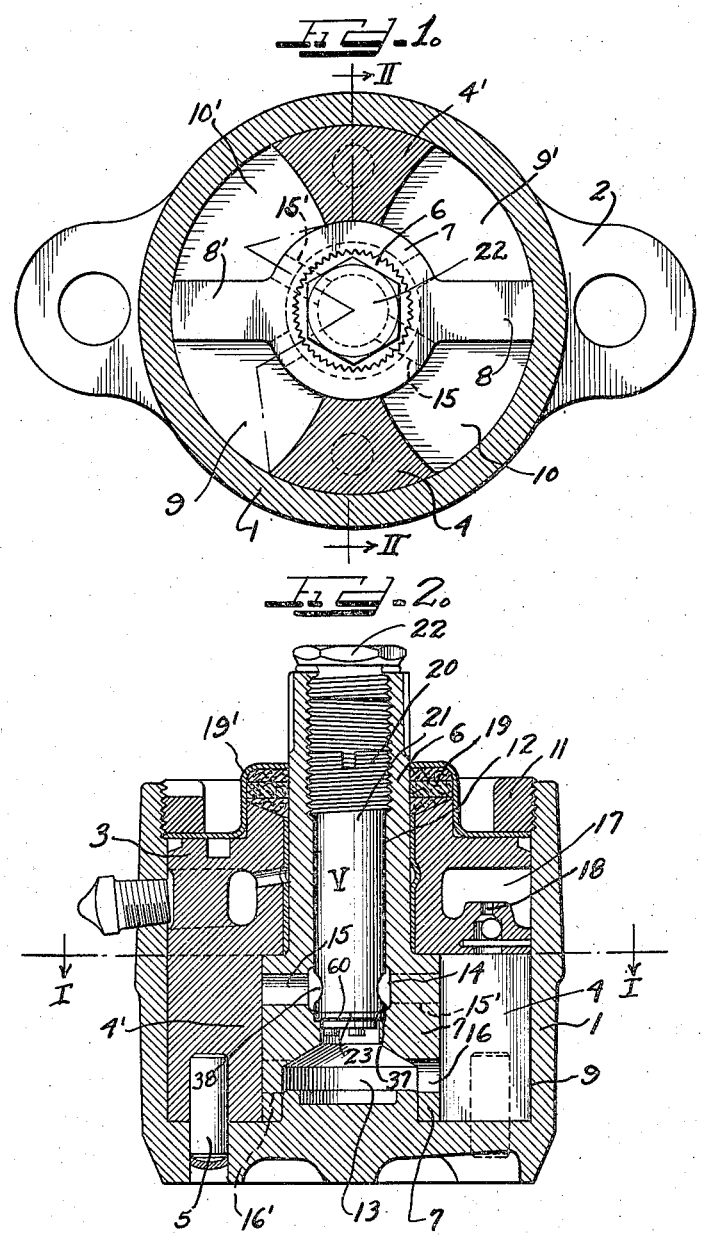
Inventors
RALPH F. PEO.
CARL F. LAUTZ.
GERVASE M. MAGRUM.

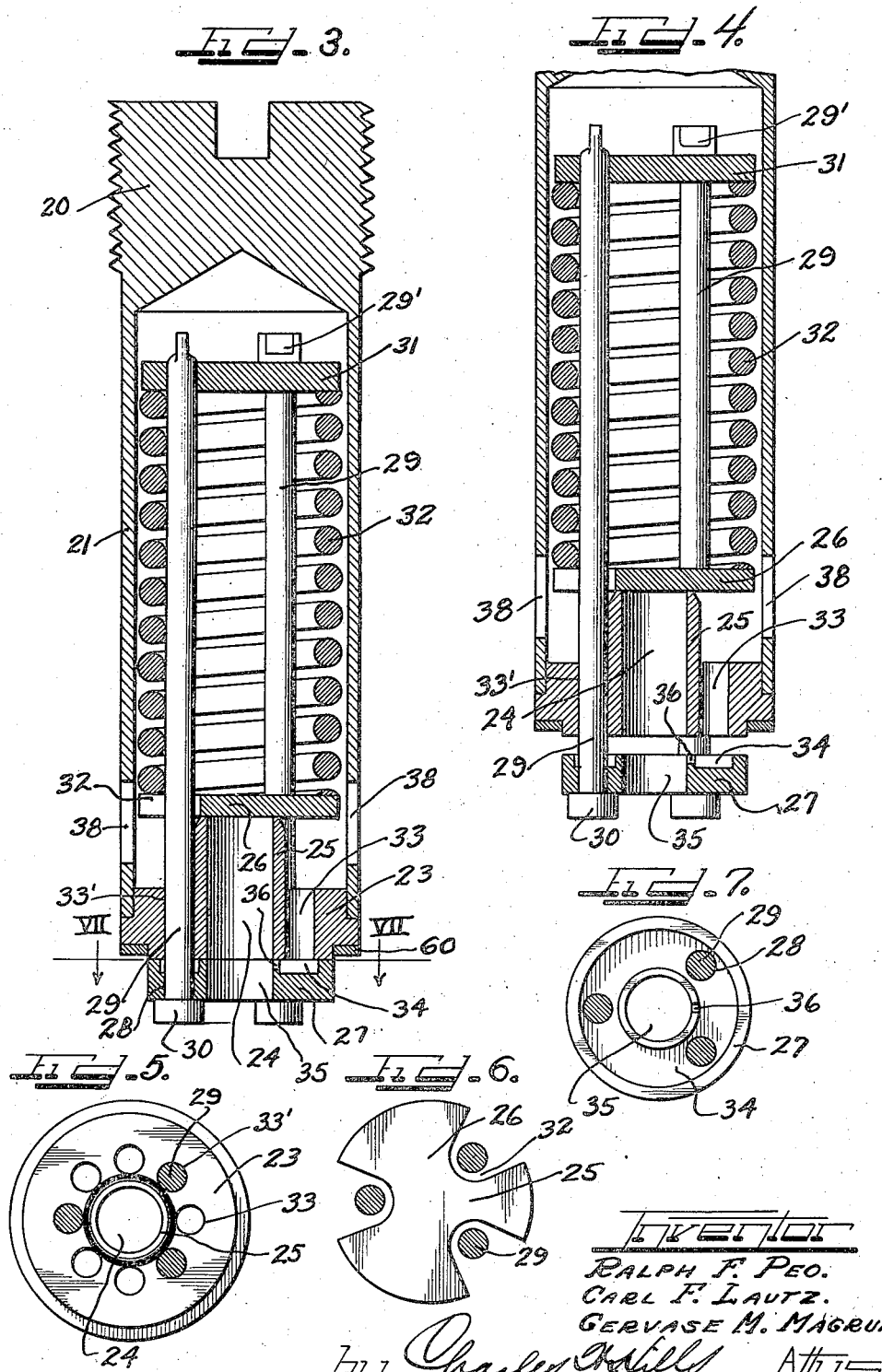

Dec. 13, 1938.        R. F. PEO ET AL        2,139,912
HYDRAULIC SHOCK ABSORBER VALVE STRUCTURE
Filed Jan. 28, 1938        4 Sheets-Sheet 3
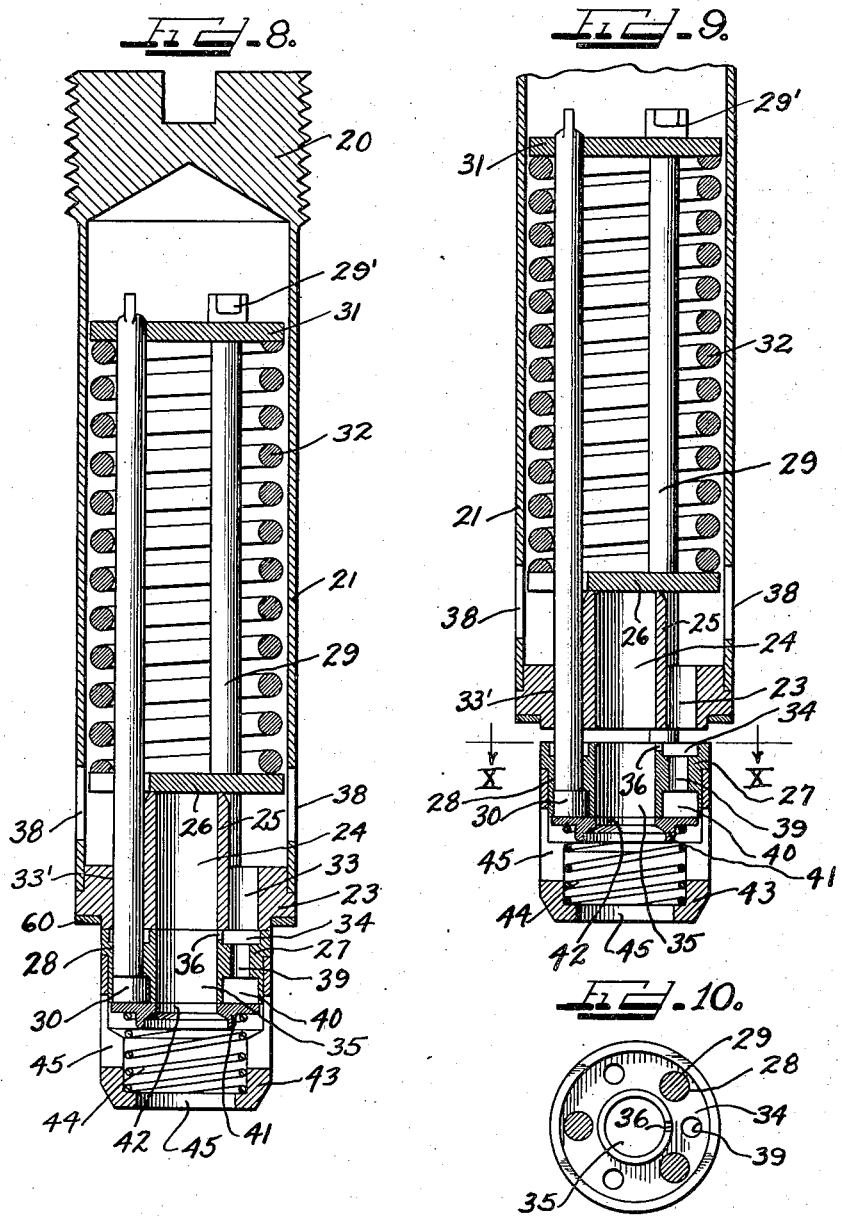

Dec. 13, 1938.   R. F. PEO ET AL   2,139,912
HYDRAULIC SHOCK ABSORBER VALVE STRUCTURE
Filed Jan. 28, 1938   4 Sheets-Sheet 4
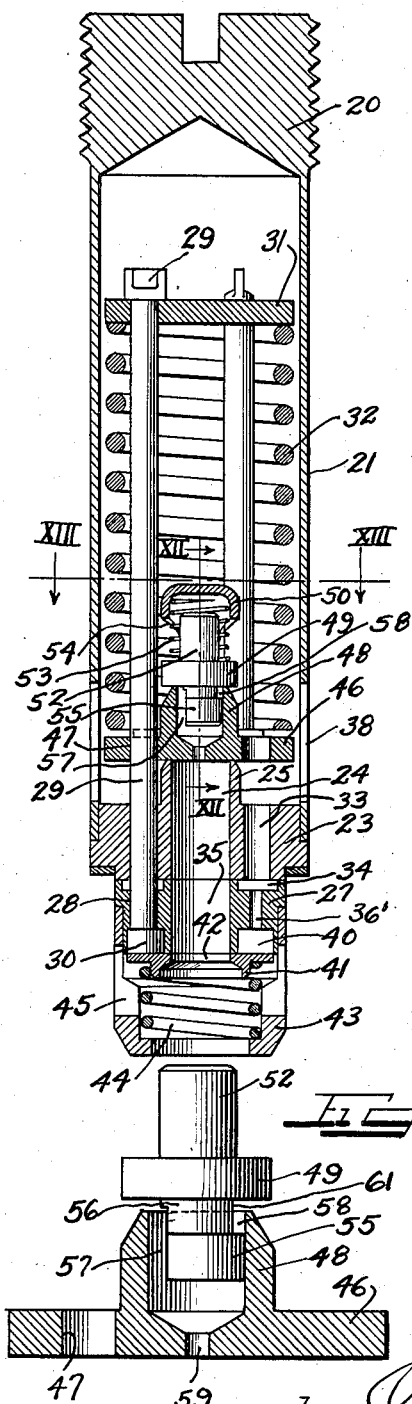
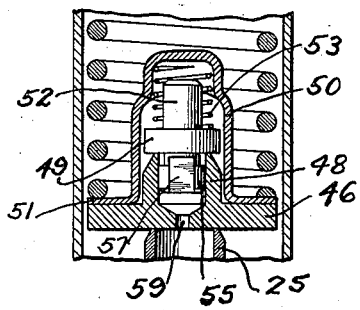
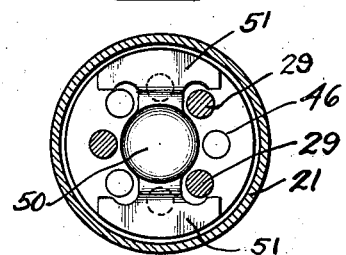
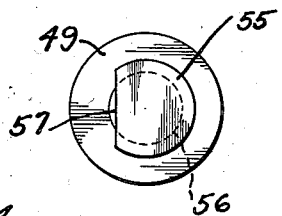
Inventors
Ralph F. Peo.
Carl F. Lautz.
Gervase M. Magrum.
by Charles O. Hills
Attys.

Patented Dec. 13, 1938

2,139,912

UNITED STATES PATENT OFFICE 2,139,912

HYDRAULIC SHOCK ABSORBER VALVE STRUCTURE

Ralph F. Peo, Carl F. Lautz, and Gervase M. Magrum, Buffalo, N. Y., assignors to Houde Engineering Corporation, Buffalo, N. Y., a corporation of New York Application January 28, 1938, Serial No. 187,352

12 Claims. (Cl. 188—100)

This invention relates to valve structure and assembly designed particularly for use in hydraulic shock absorbers on automotive vehicles for efficiently controlling the hydraulic fluid flow for control of the vehicle springs both during bound movement and rebound movement.

An important feature of the invention is to assemble the various controlling valves, the valve seats, springs and other functioning parts into a complete unitary structure which may be readily withdrawn from a shock absorber for replacement by another valve assembly in case of failure or breakage, or where a replacement valve with different shock absorbing characteristics is desired.

A further important feature is to enclose the assembled functioning elements of the unitary assembly in a sleeve or enclosing housing which, together with the functioning elements may be withdrawn as a unit from the shock absorber, and prevent tampering with the adjustments which were carefully made at the factory for the particular hydraulic fluid flow control service desired, so that unskilled persons would be unable to tamper with an assembly and re-insert it into the shock absorber with resulting inefficient operation of the shock absorber.

Another feature is such structure and arrangement that the elements providing the orifices for bound or rebound flow can be separated and made totally independent of each other, and that the blowoff valves for bound and rebound may be properly proportioned as to fluid pressure engageable area so that practically any desired blowoff strength can be obtained.

Still another feature is construction and arrangement including static valves and blowoff valves, with the static valves arranged to allow a comparatively high but slow speed resistance build-up without changing normal orifice action, and the blowoff valves arranged to give rapid high speed resistance build-up without a corresponding high resistant orifice action.

Still another feature is structure and arrangement involving simple, economically manufactured functioning elements, and in which all seating and sealing surfaces are flat and easily machined.

The above enumerated and other features of the invention are incorporated in the structure disclosed on the drawings, in which drawings:

Figure 1 is the plan view of a shock absorber in section on plane I—I Figure 2;

Figure 2 is a section on plane II—II Figure 1 and showing the unitary valve assembly therein in side elevation;

Figure 3 is a longitudinal diametral section of one form of valve assembly;

Figure 4 is a view similar to Figure 3 but showing one of the valves open;

Figure 5 is an inner side view of the valve seating element;

Figure 6 is a plan view of the rebound blowoff valve and showing guide rods in section;

Figure 7 is an inner side view of the bound blowoff valve;

Figure 8 is a longitudinal diametral section of a modified valve assembly;

Figure 9 is a view similar to Figure 8 showing one of the valve structures unseated;

Figure 10 is a section on plane X—X Figure 9;

Figure 11 is a longitudinal diametral section of still another form of valve assembly;

Figure 12 is a section on plane XII—XII, Figure 11;

Figure 13 is a section on plane XIII—XIII, Figure 11;

Figure 14 is an enlarged section of the rebound blowoff valve in the structure of Figure 11 and showing the associated static valve in open position; and Figure 15 is an end view of the static valve shown in Figure 14.

Figures 1 and 2 show a shock absorber to which the improved valve assemblies may be applied. The shock absorber structure comprises the cup shaped cylindrical housing 1 having ears 2 extending from its base for supporting the structure on the vehicle chassis.

The cover or closure wall 3 for the housing has extensions forming the stationary vanes or partitions 4 and 4', the cover structure being held in place by pin 5 extending through the housing base into the ends of the partitions.

The wall 3 journals the shaft 6 of the piston structure, the shaft terminating in a cylindrical hub 7 from which extends the vanes 8 and 8', these piston vanes with the partitions 4 and 4' defining high pressure working chambers 9 and 9' and low pressure working chambers 10 and 10'. A clamping ring 11 screws into the end of the housing 1 for holding the wall 3 and the partitions 4 and 4' against axial displacement in the housing.

The shaft 6 has the axial bore 12 therethrough communicating with the chamber 13 in the inner end of the hub 7, the end of this chamber being closed by the base of the housing 1. At the outer end of the hub 7 is the annular channel 14 which is in communication with the low pressure working chambers 10 and 10' through the passages 15 and 15' in the piston hub. The high pressure working chambers 9 and 9' communicate with the chamber 13 through passages 16 and 16'. At its outer end the shaft 6 is knurled for reception of the hub of a lever (not shown) which forms part of the connection of the piston structure with the vehicle axle.

The wall 3 is hollow to provide the annular hydraulic fluid reservoir 17 connected with the working chambers through check valve controlled passageways 18. Suitable packing 19 is retained around the shaft by a cup 19' which is clamped between the ring 11 and the wall 3.

At its outer end, the bore 12 of the piston shaft is threaded for reception of the threaded head 20 of the enclosing sleeve or housing 21 of the valve assembly V which projects through the shaft bore to control the interflow of displaced hydraulic fluid between the high and low pressure working chambers during service of the shock absorbers. At its outer end, the shaft bore is normally closed by a plug 22.

Referring to Figures 3 to 7, which show the details of one form of valve assembly, the head 20 closes the upper end of the sleeve or housing 21, the sleeve at its lower end being secured to and closed by the seat member 23. This seat member has the axially extending bore or passageway 24 which continues through the seat flange 25 extending outwardly. At its outer edge, the flange is beveled to form a seat for the valve disc 26 which controls the blowoff flow during rebound stroke of the shock absorber.

The flat outer side of the seat member 23 forms a seat for the valve disc 27 which controls the blowoff fluid flow during the bound stroke of the shock absorber. As best shown in Figure 7, the valve disc has a number of holes 28 therethrough, three being shown, these holes serving for receiving tie pins 29 whose heads 30 engage against the outer face of the valve disc 27, the pins at their upper ends extending through holes in the abutment disc 31, the valve disc 26 having the recesses 32 through which the pins extend. A helical spring 32 is interposed between the valve disc 26 and the abutment disc 31. The spring is given a normal compression or set which setting is maintained by expanding the ends 29' of the pins to form a seating for the disc 31. The spring 32 acts as a common resilient means for resisting unseating movement of the valve discs 26 and 27 by the fluid pressure.

The seat member 23 has a plurality of fluid passageways 33, three of which are spaced for passage therethrough of the pins 29, the pin receiving passages being designated by 33'. In the inner side of the valve disc 27 is the annular recess or channel 34 which communicates with the flow passages 33 through the seat member 23. The valve disc 27 has the axial passageway 35 in alignment with the passageway 24 through the seat member 23, and the comparatively thin wall intervening between the passageway 35 and the annular collecting channel 34 has the notch 36 which serves as a fluid flow metering orifice.

The valving assembly of Figures 3 to 7 is shown in Figures 1 and 2, the lower end of the assembly seating against the shoulder 37 in the piston hub 7 and closing the piston shaft bore 12 against direct flow of fluid between the high and low pressure working chambers of the shock absorber, passages 15, 15' and 16, 16' communicating respectively with the collecting channel 14 and the chamber 13 in the disc 27, the enclosing housing 21 of the valve assembly having passageways 38 communicating with the collecting channel 14.

Describing now the operation during bound stroke of the shock absorber piston structure, that is, when the vehicle body and axle approach each other, the fluid displayed from the low pressure working chambers 10 and 10' flows through the passageways 15 and 15' into the collecting channel 14 from where it flows into the sleeve 21 through the passages 38 and then through the holes 33 in the seating member 23 and into the collecting channel 34 of the closed valve disc 27, and from there through the metering orifice 36 into the passageway 35 of the valve disc 27 and then into chamber 13 and out through the passages 16 and 16' into the high pressure working chambers 9 and 9'. During normal pressure, the orifice 36 will be able to take care of the flow, but under abnormal fluid flow impulses, the fluid pressure acting against the valve 27 will unseat this valve against the resistance of the spring 32 for relief of the excess pressure until normal pressure conditions again prevail.

During the rebound stroke of the piston structure, that is, when the vehicle body and axle separate, the fluid displaced from the high pressure working chambers 9 and 9' flows through the passages 16 and 16' into chamber 13 and into and through the orifice 36 into the collecting channel 34 of the valve disc 27 and then through the holes 33 of the seating member 23 and out of the sleeve passages 38 into the collecting channel 14 from where it flows through the passages 15 and 15' into the low pressure working chambers 10 and 10'. During normal pressure conditions, the orifice 36 will meter this rebound flow, but when abnormal pressure impulses occur, the valve disc 26 is lifted from its seat 25 against the resistance of the spring 32 so that fluid may flow upwardly through the passageway 24 in the seat member and past the valve 26 and to the low pressure working chambers for relief of the abnormal pressure flow until normal pressure conditions again prevail. The orifice 36 thus serves to meter and control the fluid flow during ordinary road and pressure conditions, and the spring 32 serves to resist unseating of the valve discs 27 and 26 for pressure blowoff during the bound and rebound movements of the shock absorber. The orifice is in control of the flow up to a predetermined working pressure and when this pressure is exceeded the valves are quickly opened for blowoff and quickly reseated after pressure release so that the orifice may assume the burden of fluid flow control.

In the modified arrangement shown on Figures 8 to 10, the arrangement is substantially the same as that in the structure in Figures 3 to 7 except that a valve is added for relief of static pressure during the bound stroke of the shock absorber. The corresponding elements are given the same reference numerals.

The static pressure release valve structure is carried by the blowoff valve 27, which is provided with passages 39 for connecting the collecting channel 34 with the annular channel 40 in the outer side of the valve, this outer side forming a seat for the annular static valve disc 41 whose axial passageway 42 registers with the passageway 35 through the valve 27. A cap 43 is seated on and secured to the valve 27 and forms an abutment for a comparatively light spring 44 which engages the static valve 41 and tends to hold it seated for closure of the annular channel 40 in the valve 27. The cap 43 has a number of openings 45 for the flow of fluid.

During operation of the shock absorber, the fluid displaced under normal pressure conditions from the low pressure working chambers 10 and 10' flows through the passages 15 and 15' into the sleeve 21 and through the passages 33 into the collecting channel 34 of the valve 27 and thence through the orifice 36 and passage 35 to the chamber 13 from where it flows through the passages 16 and 16' to the high pressure working chambers 9 and 9'. During rebound operation under ordinary pressure conditions, the fluid flow is from the high pressure chambers to the low pressure chambers in reverse direction through the path just traced, the orifice 36 taking care of the flow in both directions under normal pressure conditions.

During the bound or compression stroke, static pressure may build up which would not be sufficient to unseat the blowoff valve 27 but which should be relieved so as not to interfere with the control of the flow by the orifice. Such static pressure will unseat the static valve 41 against the comparatively light resistance of the spring 44 so that fluid may flow in shunt of the orifice 36 and through the passages 39 and past the open valve 41, the passages 39, of which there may be one or more, then acting as orifices to control the flow until the static pressure is relieved and the orifice 36 again controls. The static valve arrangement is designed to allow comparatively high but slow speed resistance build-up before it relieves the static pressure so that the functioning of the orifice 36 is not materially interfered with.

Under abnormal pressure flow impulses, when the displaced fluid may not flow sufficiently rapidly through the orifice 36 or through the orifices 39, the pressure will unseat the valve 27 against the resistance of the spring 32 for sufficiently additional flow passageway for quick release of the abnormal pressure so that normal flow conditions may be quickly resumed. Abnormal pressure impulses during rebound movement of the shock absorber will lift and unseat the valve 26 against resistance of the spring 32 for quick release of the abnormal pressure and resumption of normal flow conditions.

In the modified arrangement of Figures 11 to 15, the structure and arrangement are substantially the same as in that of Figures 8 to 10, except that the rebound blowoff valve has a static pressure relief valve associated therewith. The structure elements in Figures 11 to 15 which are the same as those of Figures 3 to 10 are given the same reference numerals.

In the arrangement of Figures 11 to 15, the orifice, such as the orifice 36 in Figures 3 to 10 is omitted, and the valve 27 is provided with an orifice 36' connecting the channels 34 and 40 in the valve. The static valve 41 is normally held seated by the spring 44 and there is no flow until the pressure exceeds the amount necessary to lift the valve 41 off its seat against the spring 44 which is preferably of comparatively light resistance. The flow will then be through and metered and controlled by the orifice 36'. During abnormal pressure flow impulses, the pressure will unseat the valve 27 for flow past the valve 27 and through the valve passageway 35 to the high pressure working chambers.

The rebound flow blowoff valve 46 is in the form of a circular disc having the holes 47 through which the pins 29 extend for holding the valve disc centered and for guiding its movements. The valve disc has the outwardly extending annular flange 48 whose outer end is beveled to form a seat for the head 49 of a static pressure responsive valve. A cap 50 surrounds the valve 49 and has the seating flanges 51 for seating the cap on the blowoff valve disc 46, the spring 32 seating on the flanges to hold the cap to the blowoff valve, there being sufficient space between the seating flanges 51 for the passage of the pins 29 which hold the disc or washer 31 for abutting the outer end of the spring 32.

Extending outwardly from the static valve disc 49 is the boss 52 for aligning a spring 53 which abuts the valve disc and the head of the cap 50, the spring being of comparatively light resistance and tending to hold the static valve disc 49 seated on the seating flange 48 on the blowoff valve 46. The cap 50 has fluid flow passageways 54 in its side walls.

The seating flange 48 receives and guides the head 55 at the end of the cylindrical neck 56 extending from the valve disc 49, the head and the neck being slabbed off on one side to leave a port passageway 57, this port passageway communicating with the annular channel 58 between the head and the neck. The space within the seating flange 48 which receives the head and neck of the starting valve, is in communication through an orifice 59 with the passageway 24 through the seating member 23.

During rebound flow under normal pressure conditions, the pressure will lift the valve disc 49 from its seat, as shown in Figure 14, and the orifice passageway 61 between the inner side of the valve disc 49 and the edge of the seat flange 48 will meter the flow and control the shock absorber action, the resistance of the spring 53 being light as compared to the resistance of the spring 32, the fluid flow being from the high pressure working chambers through the passageways 35 and 24 and through the passageway 59 into the space surrounded by the flange 48, the fluid flowing then through the passageway 57 in the head or neck of the valve 49 and out of the orifice 61 defined by the seating edge and the valve disc 49.

During abnormal pressure flow impulses on rebound, the pressure will lift the blowoff valve disc 46 from its seat for increased flow passageway, the spring 32 resisting such unseating of the valve. Under normal pressure conditions on rebound, the valve 49 will meter the flow and any static pressure conditions will open the valve 49 wider for release of excess static pressure.

The valve structures shown are each in the form of a complete unitary assembly of which the supporting sleeve 21 forms an enclosing and protecting housing to prevent tampering with the adjustment even though the assembly is removed from the shock absorber. The various unitary assemblies shown are interchangeable for insertion into a shock absorber for the desired shock absorbing characteristics. The assembly is screwed into the threaded bore of the shock absorber piston shaft and against the seat 37 provided therefor in the piston hub, and preferably a sealing washer 60 is interposed. All the functioning elements are compactly concentrically arranged around a common axis, and the fluid flow passageways through the assembly are short thereby reducing the interference to flow so that the various orifices may properly and efficiently function. The various orifices are more or less of the sharp edge type so as to minimize the effect of viscosity change in the fluid on the flow of the fluid.

We have shown practical and efficient embodiments of the various features of our invention but we do not desire to be limited to the exact construction, arrangement and operation, shown and described, as changes and modifications may be made without departing from the scope of the invention.

We claim as follows:

1. A valving assembly for controlling the displaced hydraulic fluid in a hydraulic shock absorber, comprising a seat member, a valve for seating against one side of said seat member, a second valve for seating against the other side of said seat member, a number of pins connected to one of said valves and extending past said seat member and beyond the other valve, an abutment at the ends of said pins, a spring interposed between said other valve and said abutment for resisting opening movement of either valve, and fluid flow passageways controlled by said valves.

2. A valving assembly adapted for controlling the displaced fluid in a hydraulic shock absorber, comprising a valve seat member having fluid flow passageways therethrough, a valve cooperating with one side of said seat for control of one of said passageways, a second valve at the opposite side of said seat for controlling the other of said passageways, a number of pins anchored to said second valve and extending through said seat member and beyond said first mentioned valve, an abutment at the ends of said pins, and a spring interposed between said abutment and said first mentioned valve for resisting movement of either of said valves relative to said seat member.

3. A valving assembly adapted for controlling the displaced fluid in a hydraulic shock absorber, comprising a seat member having fluid flow passageways therethrough, valves at opposite sides of said seat member concentric therewith for seating thereagainst to control the flow through said passageways, a number of pins extending through said seat member and valves, said pins being anchored to one of said valves, an abutment to which the other ends of said pins are anchored, and a spring interposed between said abutment and the other valve, said spring being under compression for resisting unseating of said valves.

4. A valving assembly adapted for controlling the displaced fluid flow in a hydraulic shock absorber, comprising a seat member having fluid flow passageways therethrough from one side thereof to the other, a valve at one side of said seat member for controlling the flow through one of said passageways, a valve at the opposite side of said seat member for controlling the flow through the other passageway, a number of pins extending through said seat member and said valves and anchored at one end to one of said valves, an abutment at the other ends of said pins, a spring between said abutment and the other valve tending to hold said valves seated for closure of said passageways under normal pressure flow but being responsive to abnormal pressure flow to permit unseating of said valves, one of said valves having an orifice therethrough communicating with one of said passageways for controlling the flow from one side to the other of said seat member when said valves are closed.

5. A valving assembly for controlling the displaced fluid flow in a hydraulic shock absorber, comprising a seat member having a passageway for flow in one direction therethrough and a second passageway for flow in the opposite direction therethrough, a valve for seating against one side of said seat member to control the flow through one of said passageways, a valve for seating against the opposite side of said member for controlling the flow through the other passageway, pins extending through said seat member and valves and anchored at one end to one of said valves, an abutment at the other end of said pins, a spring between said abutment and the other valve normally tensioned to hold said valves against their seats and resist opening thereof, and means providing an orifice between said passageways for the flow of fluid in either direction from one side of said seat member to the other when said valves are closed.

6. A valving assembly for controlling the flow of displaced fluid in a hydraulic shock absorber, comprising a seat member having an axial fluid flow passageway therethrough, a blowoff valve at one side of said seat member for controlling said axial passageway, a second annular blowoff valve at the other side of said seat member with its bore in alignment with said seat member axial passageway, a side passageway through said seat member controlled by said second valve, said second valve having a passageway therethrough in alignment with said side passageway, a static pressure responsive valve seated on said second valve to control the passageway therethrough, a comparative light spring resisting unseating of said static valve, and a common comparatively heavy spring for resisting unseating of said first mentioned valve and said second valve.

7. A valving assembly for controlling the bound and rebound fluid flow in a hydraulic shock absorber, comprising a seat member having a passageway therethrough for rebound fluid flow, a blowoff valve cooperable with said seat member to control said rebound fluid flow, a blowoff valve for bound fluid flow cooperable with the other side of said seat member, means defining a restricted path for either bound or rebound flow when said blowoff valves are seated, a static pressure controlled valve seated on said bound blowoff valve, a comparatively light spring normally seating said static valve, means defining a less resistant path for bound flow when said static valve is unseated, and a common comparatively heavy spring tending to hold said blowoff valves seated.

8. A valving assembly for controlling the bound and rebound fluid flow in a hydraulic shock absorber, comprising a seat member having a passageway therethrough for rebound fluid flow, a blowoff valve for cooperating with one side of said seat for controlling the rebound blowoff flow, a bound flow blowoff valve cooperable with the other side of said seat member, means defining a restricted path through said seat member and said bound blowoff valve for metering the flow either on bound or rebound when said blowoff valves are seated, means defining a less resistant path through said seat member and bound blowoff valve when said blowoff valves are seated, a static pressure responsive valve seated on said bound blowoff valve and a comparatively light spring normally seating said static valve for closure of said less resistant path, said less resistant path including an orifice for metering the bound flow when said static valve is unseated, and a common spring for normally holding said blowoff valves seated and for resisting unseating of either blowoff valve for excess fluid pressure blowoff.

9. A valving assembly for controlling the displaced fluid flow in a hydraulic shock absorber, comprising a seat member having flow passageways therethrough, a blowoff valve at one side of said seat and a blowoff valve at the opposite side of said seat member, a common comparatively heavy spring resisting opening of said passageways by said blowoff valve except for blowoff of excess pressure, and a normal pressure flow controlling valve seated on each of said blowoff valves and each controlled by a comparatively light spring for regulating normal pressure flow through said passageways.

10. A valving assembly for controlling the bound and rebound fluid flow in a hydraulic shock absorber, comprising a seat member having a passageway therethrough for bound flow and a passageway therethrough for rebound flow, a blowoff valve at one side of said seat member for rebound flow blowoff, a blowoff valve at the opposite side of said seat member for bound flow blowoff, a common spring normally holding said blowoff valves seated and resisting blowoff movement thereof, a static pressure responsive valve seated on said rebound blowoff valve, said rebound blowoff valve having a passageway therethrough, a spring normally holding said static valve seated to close the passageway through said rebound blowoff valve but responsive to static pressure for opening of said passageway for rebound flow, a static pressure responsive valve seated on said bound blowoff valve, and a spring normally holding said static valve closed but responsive to static pressure against the valve for permitting opening of said valve for bound flow.

11. A valving assembly for controlling the bound and rebound fluid flow in a hydraulic shock absorber, comprising a seat member having a passageway therethrough for bound flow and a passageway therethrough for rebound flow, a blowoff valve at one side of said seat member for rebound flow blowoff, a blowoff valve at the opposite side of said seat member for bound flow blowoff, a common spring normally holding said blowoff valves seated and resisting blowoff movement thereof, a static pressure responsive valve seated on said rebound blowoff valve, said rebound blowoff valve having a passageway therethrough, a spring normally holding said static valve seated to close the passageway through said rebound blowoff valve but responsive to static pressure for opening of said passageway for rebound flow, a static pressure responsive valve seated on said bound flow blowoff valve and a spring normally holding said static valve closed but responsive to static pressure against the valve for permitting opening of said valve for bound flow, said rebound blowoff valves and the static valve mounted thereon defining a metering orifice when the static valve is open for metering the rebound flow under normal pressure, and said bound blowoff valve having a port for metering the flow under normal pressure when said corresponding static valve is open.

12. In a hydraulic shock absorber comprising hydraulic working chambers and a hollow piston structure between said chambers provided with fluid flow passageways in communication with said chambers, a unitary valving assembly insertable into the hollow piston structure from the exterior thereof and comprising an enclosing housing having a head at its outer end and a valve seat member at its inner end disposed between the flow passageways through said piston structure, means defining a restricted orifice controlled passageway through said valving assembly for flow in either direction of fluid between said working chambers, a blowoff valve at one side of said seating member for controlling blowoff flow in one direction, a blowoff valve at the other side of said seating member for controlling the blowoff flow in the opposite direction, and a common spring within said valve assembly housing connected with said blowoff valves for controlling the unseating thereof.

RALPH F. PEO.
CARL F. LAUTZ.
GERVASE M. MAGRUM.